United States Patent
Raboin (10) Patent No.: US 10,099,190 B2
(45) Date of Patent: *Oct. 16, 2018

(54) TERMINATION DEVICE OF A REACTOR OF A FLUID CATALYTIC CRACKING UNIT

(71) Applicant: Total Raffinage Chimie, Courbevoie (FR)

(72) Inventor: Jean-Christophe Raboin, Chaumont sur Tharonne (FR)

(73) Assignee: Total Raffinage Chimie, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/326,706

(22) PCT Filed: Jul. 23, 2015

(86) PCT No.: PCT/EP2015/066901
§ 371 (c)(1),
(2) Date: Jan. 17, 2017

(87) PCT Pub. No.: WO2016/016091
PCT Pub. Date: Feb. 4, 2016

(65) Prior Publication Data
US 2017/0203270 A1   Jul. 20, 2017

(30) Foreign Application Priority Data

Jul. 28, 2014   (FR) .................................. 14 57254

(51) Int. Cl.
*B01J 8/00* (2006.01)
*B01J 19/02* (2006.01)
(Continued)

(52) U.S. Cl.
CPC ............ *B01J 8/0055* (2013.01); *B01D 45/04* (2013.01); *B01D 45/16* (2013.01); *B01J 8/0065* (2013.01);
(Continued)

(58) Field of Classification Search
CPC ........ B01J 8/005; B01J 8/0055; B01J 8/0065; B01J 19/02; B01D 45/04; B01D 45/16;
(Continued)

(56) References Cited

U.S. PATENT DOCUMENTS

| | | | |
|---|---|---|---|
| 3,273,320 A | 9/1966 | Delaune et al. | |
| 4,664,888 A * | 5/1987 | Castagnos, Jr. | ........ B01J 8/0055 422/144 |

(Continued)

FOREIGN PATENT DOCUMENTS

| | | |
|---|---|---|
| EP | 0329494 A1 | 8/1989 |
| EP | 0332277 A2 | 9/1989 |

(Continued)

OTHER PUBLICATIONS

International Search Report issued in PCT/EP2015/066901, dated Oct. 14, 2015, 5 pages.

*Primary Examiner* — Lessanework Seifu
(74) *Attorney, Agent, or Firm* — Albert Shung (57) ABSTRACT

The invention relates to a termination device of a tubular reactor comprising at least one separation element adapted for the separation of solid particles and gaseous effluents and at least one coupling element that is part of an end of said tubular reactor, said separation element being connected to said coupling element, characterized in that each element of the termination device is made of ceramic material. The invention also relates to a tubular reactor, having a vertical or substantially vertical axis, of a fluid catalytic cracking unit equipped with a termination device according to the (Continued)

invention and to a corresponding fluid catalytic cracking unit.

14 Claims, 2 Drawing Sheets

(51) Int. Cl.
| | | |
|---|---|---|
| *C04B 35/622* | (2006.01) | |
| *C04B 35/80* | (2006.01) | |
| *C04B 35/628* | (2006.01) | |
| *C04B 35/64* | (2006.01) | |
| *C10G 11/18* | (2006.01) | |
| *B01D 45/16* | (2006.01) | |
| *B01D 45/04* | (2006.01) | |

(52) U.S. Cl.
CPC ......... *B01J 19/02* (2013.01); *C04B 35/62218* (2013.01); *C04B 35/62844* (2013.01); *C04B 35/64* (2013.01); *C04B 35/803* (2013.01); *C04B 35/806* (2013.01); *C10G 11/18* (2013.01); *B01J 2208/06* (2013.01); *B01J 2219/0263* (2013.01); *C04B 2235/6028* (2013.01); *C04B 2235/614* (2013.01); *C10G 2300/4075* (2013.01)

(58) Field of Classification Search
CPC ....... C04B 35/64; C04B 35/80; C04B 35/803; C04B 35/806; C04B 35/62218; C04B 35/62844; C04B 2235/6028; C04B 2235/614
See application file for complete search history.

(56) References Cited

U.S. PATENT DOCUMENTS

| | | | |
|---|---|---|---|
| 5,637,815 | A | 6/1997 | Takahata et al. |
| 5,906,799 | A | 5/1999 | Burgie et al. |
| 6,296,812 | B1 | 10/2001 | Gauthier et al. |
| 7,429,363 | B2 | 9/2008 | Yuan et al. |
| 2009/0023900 | A1 | 1/2009 | Huse et al. |
| 2011/0253600 | A1 | 10/2011 | Niccum |

FOREIGN PATENT DOCUMENTS

| | | |
|---|---|---|
| EP | 1017762 A1 | 7/2000 |
| EP | 0852963 B1 | 11/2005 |
| WO | 2012119805 A1 | 9/2012 |

\* cited by examiner

TERMINATION DEVICE OF A REACTOR OF A FLUID CATALYTIC CRACKING UNIT

CROSS-REFERENCE TO RELATED APPLICATIONS

This application claims the benefit of PCT/EP2015/066901, filed Jul. 23, 2015, which claims priority from FR 1457254 filed Jul. 28, 2014.

The invention relates to a termination device of a reactor of a fluid catalytic cracking (FCC) unit, in particular of a reactor having an ascending flow.

The invention relates to the problems of degradation of the metal walls of the internal equipment of a catalytic cracking unit. These degradation problems may be due to erosion caused by the circulation of abrasive catalyst particles within the catalytic cracking unit or to corrosion, owing to the presence of corrosive gases in certain portions of the catalytic cracking unit.

In an FCC unit, the feedstock to be treated and the catalyst are introduced together into a substantially vertical tubular reactor, which may have ascending flow, customarily known as a riser reactor, or have descending flow, customarily known as a downer reactor. The temperature of the reactor may achieve several hundreds of degrees centigrade, for example from 520° C. to 550° C. On leaving the reactor, the cracking reactions must be terminated as rapidly as possible in order to avoid cracking the products obtained leading to the formation of undesired products such as light gases, coke or other products. For this purpose, the reactor is terminated by a termination device which makes it possible to rapidly stop the cracking reactions. Such a device is referred to as a "riser termination device" (RTD) for a riser reactor.

Such a rapid stopping of the reactions may be obtained by means of a termination device that enables the application of one or more of the following principles:
- separation of the catalyst and of the gaseous effluents, thus putting a stop to the catalytic reactions,
- reduction of the residence time of the gaseous effluents, which reduces both the thermal and catalytic cracking,
- reduction of the temperature, which makes it possible to reduce not only the catalytic cracking, but also, more importantly, the thermal cracking reactions.

The main function of a termination device of a reactor is thus to separate the coked catalyst from the gaseous hydrocarbons resulting from the cracking of the feedstock. The termination device of a reactor having an ascending flow is generally located inside a chamber referred to as a disengager, located downstream of the reactor. It may also be outside of this chamber. The disengager generally contains one or more cyclone stages—a cyclone being apparatus that uses centrifugal force to carry out a mechanical separation of the particles in suspension in a gas—in order to separate the remaining catalyst particles from the gaseous effluents.

Various reactor termination devices exist, in particular for reactors having an ascending flow. These termination devices comprise a separation element, arranged in order to separate the solid particles contained in the gaseous effluents, connected directly to the end portion of the reactor located downstream with respect to the circulation of fluids within the reactor.

Certain termination devices comprise one or more ballistic separation elements. Such a separation element is arranged in order to abruptly reduce the velocity of the particles, causing the latter to fall by gravity. Other termination devices comprise one or more circulation separation elements, which are arranged in order to entrain the mixture to be separated along a circular or substantially circular trajectory bringing it into contact with the walls of the chamber, thus producing a separation of the particles and of the gaseous effluents, the gaseous effluents continuing their circular or substantially circular trajectory up to the outlet of the separation element. Other termination devices comprise one or more separation elements that use centrifugal force, such as a cyclone, each being connected directly to the end portion of the reactor. In other words, the end of the reactor is then connected directly to this or these cyclone(s), which are sometimes referred to as "rough cut cyclones" or "coupled cyclones". This or these cyclone(s) may themselves each be connected in series to another cyclone.

Irrespective of its configuration, the termination device of a reactor, in particular of a reactor having an ascending flow, is subject to erosion due to the circulation of the catalyst.

Figure 5:
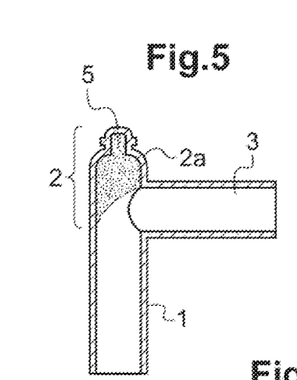
FIG. 5 is a schematic representation of an end portion of a reactor of an FCC unit according to the prior art.

As represented in FIG. 5, certain riser reactors 1 thus have an upper portion 2, the end 2a of which is closed. This end 2a has for example a concave shape, the concavity of which is pointed downwards. Slightly below this closed end 2a, a pipe 3 is diverted back down at a right angle for the outlet of the gaseous effluents. The upper portion 2 of the reactor thus has a sideways T shape. Since the reactor 1 is positioned substantially vertically, the catalyst particles 5 contained in the rising gas stream accumulate inside the closed end 2a of the reactor, thus forming a layer that protects against erosion. This configuration of the upper portion of the reactor in a T shape is considered to be part of the termination device of the reactor. A certain amount of catalyst is however trapped and cannot be used.

For termination devices connected to the reactor in the continuation of the latter, the catalyst particles impact directly on walls that are part of the termination device, without being able to accumulate thereon in order to form a protective layer. In this case, it is necessary to protect the wall that is subject to the impact of the particles from erosion, for example by installing a protective coating.

Such walls, which are generally metal walls, are thus generally covered with a coating consisting of a composite material, in general a concrete, held by an anchoring structure, which is usually metallic. These anchoring structures are welded to the metal walls and thus provide the attachment of the composite material. They may have a honeycomb shape comprising a plurality of hexagonal cells firmly attached to one another via their side. The anchoring structure is then welded to the metal wall by welding one portion only of the cells to the metal wall. Each cell is then filled with composite material. This configuration of the coating also makes it possible to ensure the absorption of the differences in expansion that exist between the metal anchoring structure and the composite material.

Such a coating makes it possible to protect the metal walls that are subject to erosion inside an FCC unit. However, over time a degradation of this coating is observed which may result in fragments of coating falling inside the termination device or reactor and may require the installation to be shutdown in order to replace the coating.

In particular, the walls of the reactor termination device are in contact with the gases resulting from the cracking of the feedstock. These gases get between the interstices of the coating and lead to the formation of coke inside these interstices, and more particularly at the junction of two juxtaposed strips of the anchoring structure. This formation of coke may lead to a significant detachment of the coating during successive cooling/reheating cycles of the chamber: the gaps that exist between the composite material and its anchoring structure are indeed filled in by the coke so that these contraction gaps can no longer play their role that consists in absorbing the differences in expansion between the anchoring structure and the composite material. This results in the formation of compression lines, cracks or even a detachment of the composite material filling the cells of the anchoring structure. The applicant has observed that these phenomena essentially occur at the metal anchoring structure and/or its bonding via welding to the metal walls, and more particularly at juxtaposed strip portions of the anchoring structure that are firmly attached by the fastening means.

In order to reduce the risks of corrosion, anchoring structures of particular shapes have been developed. However, they do not make it possible to be completely free of degradations due to corrosion or erosion. Moreover, such coatings must be produced manually and are particularly time-consuming and difficult to install. The maintenance operations are thus long and costly. Finally, they considerably weigh down the metal walls covered: indeed this type of coating frequently has a thickness of up to around 6 centimeters, which requires the production of metal walls of great thickness, further increasing the overall cost of the equipment.

There is therefore a need for termination devices of a reactor having an ascending flow of an FCC unit that have a better resistance to erosion and to corrosion and the maintenance of which is not very expensive.

The invention aims to overcome these drawbacks by proposing a termination device of a tubular reactor comprising at least one separation element adapted for the separation of solid particles and gaseous effluents and at least one coupling element that is part of an end of said tubular reactor, said separation element being connected to said coupling element, characterized in that each element of the termination device is made of ceramic material.

In particular, each element of the termination device, more specifically the walls of these elements, is without a coating comprising an anchoring structure that defines cells filled with composite material of concrete or cement type, of the type described above.

The termination device according to the invention has the advantage of being made of ceramic material, at least for its main elements, namely the separation element and the coupling element.

Ceramic materials have proved suitable for the usage conditions of an FCC unit. In particular, these materials may have good corrosion resistance and thermal resistance.

Ceramic materials have a relatively high hardness, greater than the catalysts used in the FCC unit, namely a hardness of at least 1400 N/mm$^2$ as Vickers hardness. Preferably, the ceramic material has a hardness of greater than 2100 N/mm$^2$ or even greater than 2500 N/mm$^2$.

Owing to this relatively high hardness, the termination device according to the invention has the advantage of not requiring the presence of a protective layer on its walls: it is thus no longer necessary to protect the walls with coatings of the type of those described above for steel walls. The result of this is a considerable weight saving of the termination device with respect to the steel termination devices customarily used. Owing to the absence of concrete-based protective coating, the risks of pollution of the cracking products by components originating from the degradation of the concrete are also reduced.

The manufacture and the maintenance of the termination devices according to the invention is also facilitated with respect to the steel termination devices covered with a concrete-type coating owing to the absence of coating to be installed or to be repaired/replaced. The maintenance operations may also be spaced out or be shorter, which makes it possible to reduce the operating costs of the FCC unit significantly.

Owing to the absence of heavy and bulky coating on the walls of the termination devices of the invention and owing to the high hardness of these termination devices, it is henceforth possible to design the shape and the dimensions of the termination devices in order to improve their capacity for rapid separation of the particles and to reduce the pressure drops. This improvement in the separation of the particles makes it possible in particular to reduce the losses of catalyst and therefore to reduce the operating cost of an FCC unit. It is moreover possible to reduce the thickness of the walls of the termination device.

The ceramic material may be selected from silicon carbide SiC, boron carbide $B_4C$, silicon nitride $Si_3N_4$, aluminium nitride AlN, boron nitride BN, alumina $Al_2O_3$, or mixtures thereof.

Preferably, the ceramic material is silicon carbide SiC or comprises silicon carbide SiC, preferably in a majority amount, for example in a content of 60% to 99.9% by weight. Silicon carbide has the advantage of possessing good mechanical and physical properties for a reasonable manufacturing cost.

As a variant, or optionally in combination, the ceramic material may comprise a ceramic matrix selected from silicon carbide SiC, boron carbide $B_4C$, silicon nitride $Si_3N_4$, aluminium nitride AlN, alumina $Al_2O_3$, or mixtures thereof, incorporated in which ceramic matrix are carbon fibres or ceramic fibres or a mixture of these fibres.

The ceramic material is then a composite material. Such a composite material may be advantageous for the portions of the termination device subjected to stretching and shear stresses. In particular, the fibres may be positioned randomly (pseudo-isotropically) or anisotropically. An anisotropic distribution of the fibres may be advantageous in particular zones, for example the end zones intended to be assembled with another material or with another part of the same material (mechanical assembly or welding, brazing) or in the case of zones subjected to a considerable stretching/shear stress. When they are present, these fibres may represent from 0.1% to 10% by weight of the composite material.

The carbon fibres may be carbon fibres with graphite planes oriented along the fibre.

The ceramic fibres may be selected from crystalline alumina fibres, mullite ($3Al_2O_3$, $2SiO_2$) fibres, crystalline or amorphous silicon carbide fibres, zirconia fibres, silica-alumina fibres, or mixtures thereof.

Preferably, the composite ceramic material comprises a silicon carbide SiC matrix comprising fibres of the aforementioned type. Preferably, the fibres are silicon carbide fibres.

Advantageously and non-limitingly, each element of the termination device according to the invention is preferably made of CMC materials (CMC=Ceramic Matrix Composite), here identified as CMC devices. In other words, the composite material here above mentioned may be a CMC.

A method of preparation of these CMC elements is preferably performed as follows:
1) Shaping a fibrous ceramic material eventually over a supporting material that could be removed without excessive effort, in order to obtain a fibrous shape that can be assimilated to the backbone of the final element to be obtained, eventually in the presence of a first resin,
2) Coating the shape obtained at step (1) with finely divided ceramic powder and at least a second resin, eventually in the presence of finely divided carbon powder, to obtain a coated shape, 3) Eventually repeat steps (1) and (2), 4) Heating the coated shape of step (2) or (3) under vacuum and/or under inert atmosphere in order to transform the resins of step (1), (2) and eventually (3) into a carbon-rich structure, essentially deprived of other elements to obtain a carbon-rich coated shape, 5) Introducing a gas within the carbon-rich coated shape of step (4) under conditions efficient to transform the carbon-rich structure into carbide containing carbon-rich structure, 6) Eventually removing the supporting material of step (1), when present, wherein carbon fibers are present at least at step (1), (2) and/or (3) within the fibrous ceramic material, within the finely divided ceramic powder, within the finely divided carbon powder, and/or within the first and/or second resin.

Preferably, the mixture of finely divided ceramic powder comprises ceramic fibers with lengths comprised between 100 nm to 5 mm in an amount from 0.1 to 20 Wt % relative to the total amount of finely divided ceramic powder+finely divided carbon powder when present.

Preferably, the fibrous ceramic material is made of non-woven fabric, woven fabric or knit made with at least one of thread, yarn, string, filament, cord, string, bundle, cable, eventually sewed to maintain the desired shape. The fibrous ceramic material and the resins can be present in an amount up to 50 wt % relative to the total amount of components. In these conditions, if a CMC is manufactured with 50 Wt % fibrous ceramic material and resins, and ceramic powder comprising 20 Wt % ceramic fibers is added, the overall content in free fibers, i.e. not contained in the fibrous ceramic material, before any thermal treatment, is 10 Wt %. (Wt %=weight percent).

The fibrous ceramic material is preferably made with carbon and/or silicon carbide fibers.

The first, second and further resin are independently selected among resins able to produce a carbon residue and to bind the different constituents of the ceramic material before thermal treatment. Suitable resins include preferably poly-methacrylic acid, poly methyl methacrylate, poly ethyl methacrylate, polymethacrylonitrile, polycarbonates, polyesters, polyolefins such as polyethylene and polypropylene, polyurethanes, polyamides, polyvinyl butyral, polyoxyethylene, phenolic resins, furfuryl alcohol resins, usual polymer precursors of carbon fibers such as polyacrylonitrile, rayon, petroleum pitch. The resins and their quantities are adjusted to the desired porosity that is obtained after thermal treatment of step (4) and before step (5). Preferably, the total porosity after treatment of step (4) should be comprised between 15 vol % and 25 vol %, more preferably between 20 vol % and 22 vol %. (Vol %=volume percent). Without wishing to be bound by theory, it is assumed the resins, when undergoing thermal treatment of step (4) transform into a network of cavities containing residual carbon atoms surrounded with voids. It is assumed the gas of step (5) moves preferentially within this network thus allowing improved homogeneity in the final CMC material. For example, 78 Wt % SiC powder which contains 0.2 Wt % of silicon carbide fiber is mixed with 17 Wt % phenolic resin and 5 Wt % poly methyl methacrylate and this mixture is used to impregnate and cover a silicon carbide fabric (which accounts for 20 Wt % of the overall weight) that surrounds a shaping support, then heated under inert gas atmosphere until complete carbonization of the resins to obtain a final product having from 16 vol % to 18 vol % total porosity.

The gas may be selected among $SiH_4$, $SiCl_4$, $ZrCl_4$, $TiCl_4$, $BCl_3$, to form corresponding carbide.

Preferred gas is $SiH_4$ or $SiCl_4$.

Preferred conditions of step (5) are standard RCVI conditions (Reactive Chemical Vapor Infiltration), more preferably using pulsed pressure.

Preferably steps (4) and (5) are each independently performed at a temperature comprised between 1100 and 1800° C. and at an absolute pressure comprised between 0.1 and 1 bar.

Preferably, the finely divided ceramic powder comprises, or eventually consists of, particles selected from silicon carbide SiC, boron carbide $B_4C$, silicon nitride $Si_3N_4$, aluminium nitride AlN, boron nitride BN, alumina $Al_2O_3$, or mixtures thereof.

Preferably, the finely divided carbon powder is carbon black.

A suitable but non limiting particle size range for the finely divided ceramic powder, and eventually finely divided carbon powder, is about 10 micrometers or less.

Such a method of preparation allows improved homogeneity in the CMC material in that porosity gradient and clogging at the surface of the material is considerably reduced or totally alleviated, depending on the experimental conditions (low temperatures ca. 1100-1300° C. and reduced pressure ca. 0.1-0.5 bar abs. are preferred). Advantageously and non-limitingly, the ceramic material may be a sintered ceramic material. This may in particular facilitate the production of elements made of ceramic, whether they are made from one or more portions or whether the termination device is produced from a single part, without welding or assembling.

In one particular embodiment, the elements of the termination device may form one and the same part made of ceramic material, for example obtained by sintering. The sintering step may be preceded by a conventional shaping step, for example by compression, extrusion or injection. Each element may also be formed for example by moulding or by extrusion, followed by a firing of the green element, under conventional operating conditions suitable for the type of ceramic produced. The firing step is optionally preceded by a drying step.

Sintering is a process for manufacturing parts that consists in heating a powder without melting it. Under the effect of heat, the grains fuse together, which forms the cohesion of the part. Sintering is especially used for obtaining the densification of ceramic materials and has the following advantages:

- it makes it possible to control the density of the substance; as a powder is used to start with and since this powder does not melt, it is possible to control the size of the powder grains (particle size) and the density of the material, depending on the degree of initial compacting of the powders;
- it makes it possible to obtain materials having a controlled porosity, that are chemically inert (low chemical reactivity and good corrosion resistance) and thermally inert;
- it makes it possible to control the dimensions of the parts produced: as there is no change of state, the variations in volume and in dimensions are not very large with respect to melting (absence of shrinkage phenomenon).

In another particular embodiment, the elements of the termination device may be separate elements made of ceramic material that are assembled together.

Advantageously and non-limitingly, the inner and/or outer walls of the termination device may be smooth, in other words they may have a low surface roughness. This makes it possible to limit the adhesion of particles to these walls and also enables the reduction of the formation of catalyst fines and therefore a reduction of the catalyst losses and a reduction of the operating costs of an FCC unit. They may also make it possible to reduce the pressure drops and may improve the flexural strength of the portions made of ceramic material.

Such a smooth wall may be obtained when the ceramic material is a sintered ceramic material.

Advantageously and non-limitingly, the portions made of ceramic material may be obtained from a relatively fine sintering powder, for example having a mean grain diameter of less than or equal to 500 nm, which may result in relatively smooth surfaces.

Alternatively or in addition, the portions made of ceramic material may be obtained by adding to the main material, for example SiC, an additive selected from boron B, silicon Si and carbon C, or mixtures thereof, for example in a proportion varying from 0.3% to 2% by weight. In the case of an SiC material obtained by powder sintering, such an addition of additive may make it possible to reduce the porosity and consequently the roughness.

Advantageously and non-limitingly, the additive may comprise a mixture of boron B, silicon Si and carbon C. It may thus be formed from additional SiC, which blocks the pores and thus reduces the roughness.

Alternatively or in addition, a step of additional deposition of SiC by chemical vapour deposition (CVD) could for example be provided.

Depending on the configurations of the separation elements, each separation element may be connected to the single coupling element or several separation elements may be connected to the same coupling element.

Furthermore, each separate element of the termination device or at least one of the separate elements of the termination device may also be made of several portions assembled together. Each portion may in particular be obtained by sintering.

The separate elements of the termination device, and/or the portions forming these elements, may be connected by welding or brazing. The assembling may for example be carried out by a diffusion welding process, for example as described in document US 2009/0239007 A1.

As a variant or in combination, separate elements of the termination device to be assembled and/or portions forming these elements to be assembled may have ends shaped in order to be assembled by interlocking or screwing.

Advantageously, the ends of the portions or elements assembled by interlocking or screwing may have a conical shape, which may make it possible to simply reduce the stresses between the parts and to improve the leaktightness between the parts.

Advantageously, each element may be a cone section or cylinder section, and these elements may be assembled by screwing or interlocking of their ends or by welding or brazing.

Advantageously, for better leaktightness, a seal may be positioned between the portions or elements assembled by interlocking or screwing. It may be, for example, a seal made of carbon or made of any other suitable material, for example made of vermiculite or made of another compressible and thermally stable material. Optionally, a seal may be positioned between portions or elements assembled by interlocking or screwing having a conical shape.

The termination device of the invention may be any known reactor termination device.

In particular, the termination device may comprise one or more of the following features:
a coupling element comprising, or consisting of, a bent pipe, in particular a pipe that is rounded and/or bent at 90°. In particular, a rounded shape may make it possible to reduce the pressure drops;
a coupling element comprising, or consisting of, a straight pipe;
one or some coupling elements forming an end of the tubular reactor;
a separation element selected from a cyclone, a circulation separation element or a ballistic separation element.

The invention also relates to a tubular reactor, having a vertical or substantially vertical axis, of a fluid catalytic cracking unit equipped with a termination device according to the invention. In particular, an end portion of the reactor, located downstream with respect to the direction of circulation of the products treated in said reactor, comprises said at least one coupling element of the termination device according to the invention, or consists of said at least one coupling element.

In particular, when the tubular reactor is made of metal, for example made of steel, in particular made of stainless steel, it is advantageously connected to said termination device by fastening means capable of absorbing a difference in expansion between the metal of the reactor and the ceramic material of the termination device.

For example, such fastening means may be formed by a layer of materials essentially comprising assembled ceramic fibres having a non-zero elastic modulus, this layer being positioned between a portion made of ceramic material and a metal portion and providing the cohesion of these portions.

Alternatively, the geometry and the dimensions of the fastening means may be adapted in order to compensate for the difference in thermal expansion between the metal and the ceramic material.

Such fastening means may comprise portions that interlock or screw together, preferably conical portions. For example, the portions to be assembled advantageously have a rotational symmetry, and their ends have complementary conical shapes.

As a variant, the fastening means may comprise one (or more) pressing element(s) capable of exerting an elastic force on a portion made of ceramic material to be assembled to a metal portion in order to press this portion made of ceramic material against the metal portion.

Thus, the fastening withstands the differential expansion between the material of the metal portion, for example a steel, preferably a stainless steel, and the ceramic material. Indeed, the ceramic may have a coefficient of thermal expansion that is much lower than that of the steel.

The pressing element may for example comprise a spring means, or other means. It might be possible, for example, to provide one or more fastening tabs that are firmly attached to (or form a single part with) a metal portion, for example that are welded. These tabs, on the one hand welded via one end to the metal portion, while the other end rests on a surface of a portion made of ceramic material, make it possible to exert an elastic bearing force on the portion made of ceramic material so as to keep this portion pressed against the metal portion. This other end may have a relatively flat surface in order to limit the zones of high mechanical stresses.

In particular, the fastening means may comprise at least one metal tab firmly attached to a fastening face of the reactor and capable of elastically bearing against an edge of the termination device in order to keep this edge bearing against the fastening face of the reactor. The fastening face and the edge may extend over the entire periphery of the ends to be assembled. They may be flanges.

As a variant, the tubular reactor may also be made of ceramic material. It may then be connected to said termination device by welding, brazing, screwing or interlocking, as described above.

In particular, the ceramic material may be the same as that described with reference to the termination device according to the invention, the assembling by welding, brazing, screwing or interlocking may be as described with reference to the assembling of a termination device made of several separate portions.

The reactor made of ceramic material may itself be made from one or more assembled portions made of ceramic material.

Finally, the invention also relates to a catalytic cracking unit comprising at least one tubular reactor according to the invention. Advantageously, this tubular reactor is a riser reactor.

The invention is now described with reference to the appended, non-limiting drawings, in which:

FIG. 7 shows an example of assembling a cyclone to the end portion of a reactor, in particular a metal reactor, FIG. 7a showing a detail from this FIG. 7.

The termination device according to the invention is made of ceramic material, preferably silicon carbide SiC. It is for example formed by injection moulding or extrusion. Injection moulding or extrusion are conventionally carried out using ceramic powders or precursors of ceramics with a binder. According to another manufacturing method, the ceramic termination device is formed by compression and heating of a ceramic powder, it being possible for the compression to be maintained during the heating step, the heating step being a step of sintering the ceramic powder. This technique is particularly well suited to the manufacture of solid elements made of silicon carbide according to the invention. The ceramic powder used optionally comprises ceramic fibres in order to increase the mechanical strength of the parts produced. The ceramic fibres, when they are present, generally represent from 0.1% to 10% by weight of the part produced.

This termination device may be arranged according to any one of the termination devices known in the prior art.

Some of these termination devices are described with reference to FIGS. 1 to 4. The invention is not however limited to these embodiments.

Figure 1:
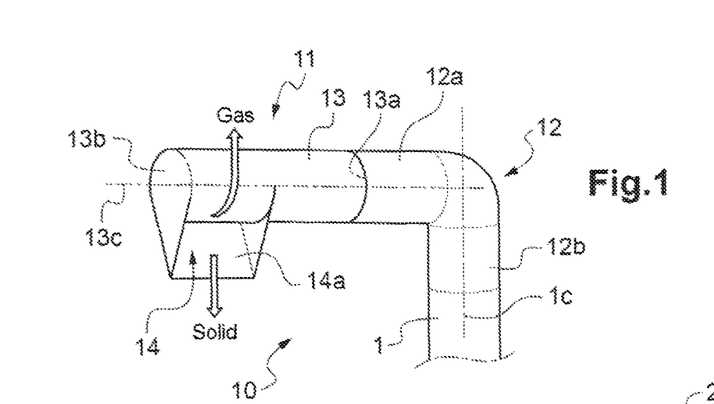
FIG. 1 is a schematic representation of a termination device according to a first embodiment.

FIG. 1 represents a ballistic-type termination device 10 of a tubular reactor 1 positioned vertically. The termination device 10 comprises a separation element 11 and a coupling element 12. The separation element 11 comprises a horizontal pipe 13, one end 13a of which is coupled to the coupling element 12 and the other end 13b of which is closed perpendicular to the axis 13c of the pipe 13. The end 13b additionally has an opening 14 pointed downwards and comprising a wall 14a which is tangent with respect to the sidewall of the pipe 13 and parallel to the axis 13c of the latter. The coupling element 12 forms the upper portion of the reactor 1. It is formed from a bent pipe, in particular a pipe bent at a right angle, the bent portion of which is rounded. A first end 12a is coupled to the separation element 11, the other end 12b being coupled to the reactor 1. The mixture of gaseous hydrocarbons and of catalyst particles circulates according to an upward flow in the reactor 1 and enters through the end 13a into the separation element 11, substantially parallel to the axis 13c. The catalyst particles projected against the closed end 13b lose their velocity and then fall by gravity out of the separation element 11 via the opening 14 whilst the gases exit via the top of this opening 14. This type of termination device thus comprises a coupling element comprising a rounded bent pipe and a ballistic-type separation element. In this example, the reactor 1 may be made of metal or equally made of ceramic material. If it is made of metal, it may be assembled to the termination device with means similar to those described with reference to FIG. 7. If it is made of ceramic, it may be assembled to the termination device by welding, brazing, or else by screwing or interlocking, in a manner similar to the assemblies represented in FIGS. 6a and 6b.

Figure 2:
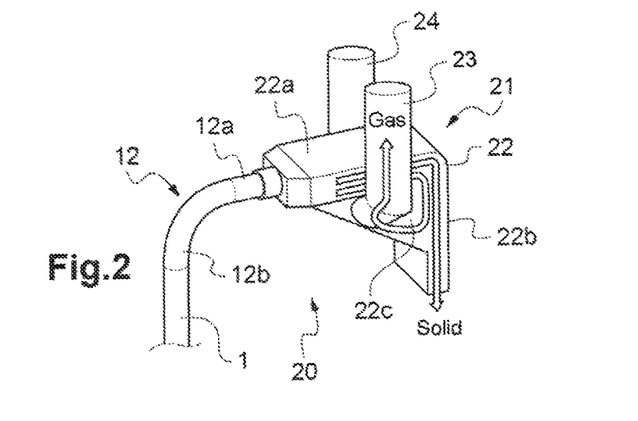
FIG. 2 is a schematic representation of a termination device according to a second embodiment.

Other reactor termination devices exist that have in particular more complex configurations but that provide a better separation efficiency. FIG. 2 thus represents a termination device 20 which comprises a separation element 21 and a coupling element 12 identical to that described with reference to FIG. 1. The separation element 21 comprises a pipe 22 bent at 90°, a horizontal portion 22a of which is coupled to the end 12a of the coupling element 12 and the vertical portion 22b of which is pointed downwards for the outlet of the particles. Two gas discharge ducts 23, 24 positioned vertically emerge from either side of a chamber 22c of the termination device 20. This chamber 22c is located under the horizontal portion 22a, in communication with the vertical portion 22b and is shaped in order to direct the incoming gas following a circular or substantially circular trajectory to the ducts 23, 24. The mixture of gaseous hydrocarbons and of catalyst particles circulates according to an upward flow in the reactor 1 and enters the separation element 21 via the horizontal portion 22a before coming back into contact against the wall of the vertical portion 22b: the particles fall by gravity in this vertical portion 22b, whilst the gases follow a circular or substantially circular trajectory before exiting in the upper portion through the vertical ducts 24, 23 via the internal chamber 22c. This type of termination device is sometimes referred to as a "quarter turn separator". This type of termination device thus comprises a coupling element comprising a rounded bent pipe and a fluid circulation separation element.

Figure 3:
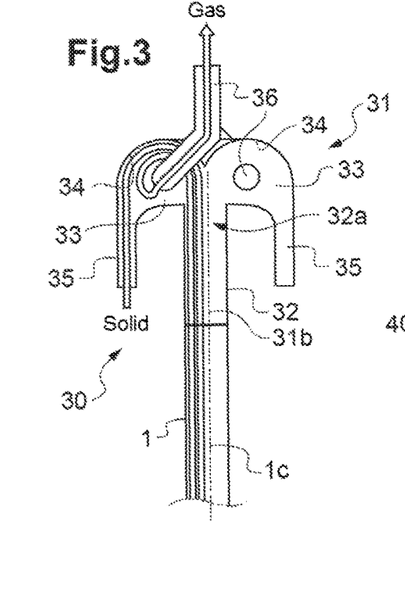
FIG. 3 is a schematic representation of a termination device according to a third embodiment.

In the same way as in the preceding example, the reactor 1 may be made of metal or equally made of ceramic material. FIG. 3 represents another termination device 30 which comprises a separation element 31 and a coupling element 32. The coupling element 32 is a straight duct positioned vertically in the continuation of the reactor 1. The upper end 32a of the coupling element opens into two separation chambers 33 that are symmetrical about the axis 1c of the reactor and of the coupling element 32. Each separation chamber 33 has a rounded concave wall 34, the concavity of which is pointed downwards. Each separation chamber 33, also referred to as volute chamber in the present application, opens into a vertical discharge duct 35 that is pointed downwards, tangent to the concave wall 34. A vertical gas discharge duct 36 is coupled horizontally to each separation chamber 33, at the centre thereof. The mixture of gaseous hydrocarbons and of catalyst particles circulates according to an upward flow in the reactor 1, enters the separation element 31, is sent to the separation chambers 33 and impacts against their concave walls 34. Under the effect of gravity, the slowed-down catalyst particles fall and are discharged through the ducts 35. The gas is discharged in the upper portion through the ducts 36. Document EP 0 332 277 A2 describes a termination device of this type with internal recirculation of the gases, documents EP 0 852 963 B1 and U.S. Pat. No. 7,429,363 B2 describe other termination devices of this type, but without internal recirculation of the gases. This type of termination device thus comprises a coupling element comprising a straight pipe and a circulation separation element comprising one or two volute chambers. In the same way as in the preceding examples, the reactor 1 may be made of metal or equally made of ceramic material.

Figure 4:
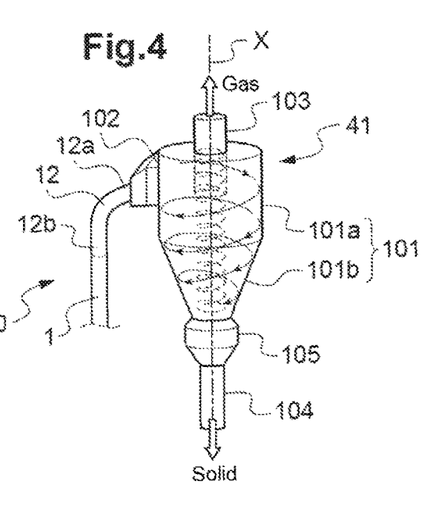
FIG. 4 is a cross-sectional schematic representation of a termination device according to a fourth embodiment.

FIG. 4 represents a termination device 40 comprising a separation element 41 and a coupling element 12. This coupling element 12 is similar to that represented in FIGS. 1 and 2. The separation element 41 is a cyclone which comprises a separation chamber 101, an inlet duct 102 that opens into the chamber 101, a gas outlet duct 103 located in the upper portion of the chamber 101 and a particle outlet duct 104 located in the lower portion of the chamber 101. The separation chamber 101, generally referred to as the body of the cyclone, is often cylindrical, as represented, or sometimes cylindroconical. In the example represented, the separation chamber 101 comprises a cylindrical upper portion 101a and a conical lower portion 101b.

The lower end of smaller diameter of this conical lower portion 101b is connected to the particle outlet duct 104, which is in the form of a tube extending in the axis of symmetry X of the separation chamber 101. This tube is often referred to as a "dip-leg" or else "leg".

Figure 4A:
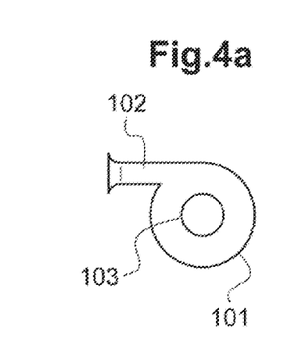
FIGS. 4a and 4b are transverse cross-sectional views of two types of cyclone at their inlet duct.
Figure 4B:
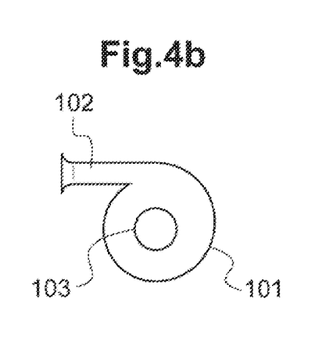

The inlet duct 102 receiving the gas/particle mixture, sometimes also referred to as suction eye or bell mouth, is formed of a tube positioned so as to impart a circular movement to the incoming mixture. Thus, the inlet duct 102 may either be tangential with respect to the separation chamber 101, as represented schematically in FIG. 4a, or be substantially tangential and form a volute, as represented in FIG. 4b.

Under the effect of this movement, the catalyst particles fall into the conical lower portion 101b of the separation chamber 101 before being discharged through the particle outlet duct 104. The gas itself exits at the upper end of the cyclone via the gas outlet duct 103, also referred to as a stack. A dust catcher 105 may be positioned between the conical lower portion 101b of the separation chamber 101 and the particle outlet duct 104.

The circulation of the gas inside the cyclone is represented by the arrows visible in FIG. 4.

The separation element 41 may be made from one or more parts made of ceramic material.

For example, the separation chamber 101 and the particle outlet duct 104 may be separate parts, it being possible for the inlet duct 102 and the gas outlet duct 103 to be made from one part with the separation chamber 101.

Figure 6A:
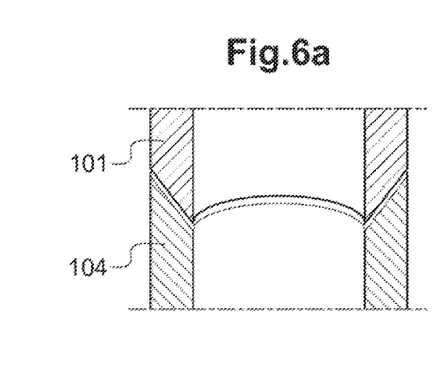
FIGS. 6a and 6b are axial cross-sectional views of the ends of two assembled parts. The assembled parts are separated in FIG. 6b for greater clarity.

The elements 101 and 104 may then be interlocked, as represented schematically in FIG. 6a by interlocking of conical end portions of complementary shape, or by screwing of their ends (FIG. 6b), or else welded or brazed (not represented). Similarly, the cylindrical upper portion 101a and the conical lower portion 101b of the separation chamber 101 may be separate portions that are assembled, it being possible for this assembling to be carried out as described above, by assembling cylindrical or conical sections, or else by assembling parts resembling bricks by interlocking and/or welding/brazing.

Figure 6B:
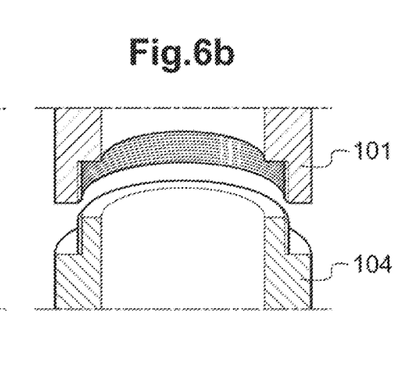

Assembly operations similar to those described with reference to FIGS. 6a, 6b may be carried out in order to assemble a separation element and a coupling element within the meaning of the invention and/or a termination device according to the invention and a ceramic tubular reactor, irrespective of their configuration.

Figures 7, 7A:
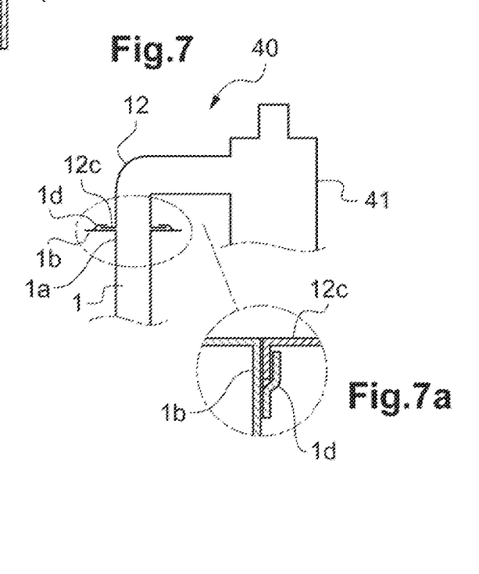

The coupling element 12 of the termination device 40 is connected directly to the tubular reactor 1, as represented schematically in FIG. 7. When this tubular reactor 1 is made of metal, its free end 1a has a fastening face 1b, firmly attached to which are at least two metal tabs 1d shaped in order to elastically bear against an edge 12c of the coupling element 12 in order to keep this edge 12c bearing against the fastening face 1b of the reactor (FIG. 7a). This edge 12c may be located at the end 12b of the coupling element 12. For a simple production, the edge 12c and the fastening face 1b may extend over the entire periphery of the assembled portions, such as for example flanges.

According to one embodiment that is not represented, the invention is also wholly applicable to a termination device of "RS2" type as disclosed in EP 1 017 762 or U.S. Pat. No. 6,296,812, the content of which is incorporated here by way of reference.

The invention claimed is:

1. A termination device of a tubular reactor comprising: at least one separation element adapted for the separation of solid particles and gaseous effluents and at least one coupling element that is part of an end of the tubular reactor, the separation element being connected to the coupling element, characterized in that each element of the termination device is made of ceramic material and the ceramic material comprises a ceramic matrix selected from silicon carbide SiC, boron carbide $B_4C$, silicon nitride $Si_3N_4$, aluminium nitride AlN, boron nitride BN, alumina $Al_2O_3$, or mixtures thereof, incorporated in which ceramic matrix are carbon fibres or ceramic fibres.

2. The termination device according to claim 1, characterized in that the ceramic fibres are selected from the group consisting of crystalline alumina fibres, mullite fibres, crystalline or amorphous silicon carbide fibres, zirconia fibres, silica-alumina fibres, and mixtures thereof.

3. The termination device according to claim 1, characterized in that the ceramic material is a sintered ceramic material.

4. The termination device according to claim 1, characterized in that the ceramic material is a Ceramic Matrix Composite (CMC).

5. The termination device according to claim 1, characterized in that the elements form one and the same part made of ceramic material.

6. The termination device according to claim 1, characterized in that the elements are separate elements made of ceramic material that are assembled together, an element being made of one part or of several portions assembled together.

7. The termination device according to claim 6, characterized in that the elements and/or the portions are assembled by welding or brazing or in that elements to be assembled and/or portions to be assembled have ends shaped in order to be assembled by interlocking or screwing.

8. The termination device according to claim 1, characterized in that the coupling element comprises a bent pipe, in particular a rounded bent pipe, or a straight pipe.

9. The termination device according to claim 1, characterized in that the separation element is selected from the group consisting of a cyclone, a circulation separation element and a ballistic separation element.

10. A tubular reactor having a vertical or substantially vertical axis, of a fluid catalytic cracking unit equipped with at least one termination device according to claim 1.

11. The tubular reactor according to claim 10 made of metal, characterized in that the reactor is connected to the termination device by fastening means suitable for absorbing a difference in expansion between the metal of the reactor and the ceramic material of the termination device.

12. The tubular reactor according to claim 10, characterized in that the tubular reactor is made of ceramic material and is connected to the termination device by welding, brazing, screwing or interlocking.

13. A catalytic cracking unit comprising at least one tubular reactor according to claim 10.

14. A method of preparation of a termination device of a tubular reactor, wherein each element of the termination device is made of Ceramic Matrix Composite (CMC), the method comprising:

1) shaping a fibrous ceramic material over a supporting material that could be removed without excessive effort, in order to obtain a fibrous shape that can be assimilated to the backbone of the final element to be obtained, in the presence of a first resin,
2) coating the shape obtained at step (1) with finely divided ceramic powder and at least a second resin, in the presence of finely divided carbon powder, to obtain a coated shape,
3) repeat steps (1) and (2),
4) heating the coated shape of step (2) or (3) under vacuum and/or under inert atmosphere in order to transform the resins of step (1), (2) and (3) into a carbon-rich structure, essentially deprived of other elements to obtain a carbon-rich coated shape,
5) introducing a gas within the carbon-rich coated shape of step (4) under conditions efficient to transform the carbon-rich structure into carbide containing carbon-rich structure,
6) removing the supporting material of step (1), when present, wherein carbon fibers are present at least at step (1), (2) and/or (3) within the fibrous ceramic material, within the finely divided ceramic powder, within the finely divided carbon powder, and/or within the first and/or second resin.

* * * * *